United States Patent [19]

Rigney et al.

[11] 3,823,395
[45] July 9, 1974

[54] REMOTE CONDITION INDICATOR FOR LOAD-LIFTING DEVICE

[75] Inventors: Edward T. Rigney, Wayland; Bradford W. Edgerton, Lynnfield; Richard A. Benson, Bedford, all of Mass.

[73] Assignee: Trans-Sonics, Inc., Lexington, Mass.

[22] Filed: May 30, 1972

[21] Appl. No.: 258,079

[52] U.S. Cl. ............ 340/267 C, 212/39 R, 340/272
[51] Int. Cl. ...................... G08b 21/00, B66c 15/00
[58] Field of Search ........ 340/267 C, 272; 212/39 R

[56] References Cited
UNITED STATES PATENTS

| | | | |
|---|---|---|---|
| 3,631,537 | 12/1971 | Zibolski et al. | 340/267 C |
| 3,638,212 | 1/1972 | Peter et al. | 340/267 C |
| 3,683,355 | 8/1972 | Collins | 340/267 C |

*Primary Examiner*—Glen R. Swann, III
*Attorney, Agent, or Firm*—Cesari and McKenna

[57] ABSTRACT

A condition indicator for a load-lifting device has a sensor at the load end of a lifting cable to measure the weight of the load being lifted, the tilt of the hook or some other condition at the load end. A transmitter associated with the sensor transmits a signal representative of the condition to a remote receiver which causes an indicator to display a signal indicative of the condition being sensed. The transmitter and receiver operate at kilohertz frequencies and utilize the load-lifting cable and the crane boom as a transmission line between them. This minimizes radiation to other units and also minimizes stray radiation pickup from other units in the vicinity.

18 Claims, 9 Drawing Figures

REMOTE CONDITION INDICATOR FOR LOAD-LIFTING DEVICE

BACKGROUND OF THE INVENTION

1. Field of the Invention

The invention relates to condition sensing devices, and more particularly to condition sensing devices utilized in conjunction with a load-lifting cable and having a transmitter at the load end of the cable and a remote receiver receiving signals from the transmitter.

2. Prior Art

Load lifting devices having a cable for lifting a load and some mechanism for moving the cable and load about are in common use. Such devices are commonly referred to as "cranes".

Frequently, it is necessary to know the weight of a load which is being lifted by a crane. For example, in some operations, the charge for services is based on the weight of the total load which has been transferred, and thus it is necessary to provide an accurate tally of this weight. This measurement is most conveniently made at the time the load is being lifted by the crane. Further, when lifting a load which may be at, or near, the safe operating limits of the crane, it is often essential to have an accurate indication of the weight of the load as well as the inclination of any load lifting line to the vertical so that the operator can stay within safety limits. This is especially true with a load-lifting crane which has a boom along which the cable runs and which is susceptible to structural failure or tipping over when overloaded. Accordingly, the invention will hereinafter be described with particular reference to boom-type cranes.

When attaching sensors to a crane for sensing the weight of a load being lifted, or some other condition associated with the load-end of the crane such as "tilt" of the crane hook from the vertical, it is generally desirable to position the sensors at the load-lifting end of the cable, so as to eliminate errors caused by sheave friction, varying cable length, etc. However, a transmitter must also be positioned adjacent the sensor to transmit the sensor output back to a remote indicator. The indicator is generally positioned in the crane operator's cab but may be positioned elsewhere, such as at a foreman's station, etc.

Heretofore both wired and wireless communication between the transmitter and receiver have been proposed. Wireless communication has the advantage that it does not require stringing a separate communications line between the transmitter and receiver. However, conventional wireless transmission has had several drawbacks. First, the signal emitted by the transmitter can be picked up by other units operating in the area and cause spurious indications at their receivers. This problem can be alleviated by utilizing a different frequency channel for each transmitter and receiver pair, but the number of different channels that can be supplied is limited and thus there remains the possibility that two units at different job sites but at the same frequency will be operating within transmission range of each other.

A second problem is the pickup of stray radiation by the receiver. As noted, this may be from other crane-weighing devices operating in the area, or may be from unrelated sources, such as commercial or private communications systems. Due to frequency allocation limitations established by Government authority, it may be impossible to utilize a frequency band committed wholly to a single weighing system to thereby insure that no other units can operate in the same frequency band in the same area. Thus, it is not possible, as a practical matter, to insure that no stray radiation of the proper frequency will be picked up by the receiver.

Further disadvantages of conventional wireless transmitting systems for the present application appear in operations such as those connected with loading and unloading ships. In such operations, the transmitter, being positioned at the load end of the cable, is lowered into the hold of a ship with the cable. The metallic walls of the ship serve as a radiation shield for the transmitter and therefore prevent, or greatly decrease, radiation from the transmitter to the receiver. Therefore the system performance is degraded, even possibly to the point of inoperability.

A hard-wired line connected between the transmitter and receiver would avoid many of the disadvantages of wireless transmission but would introduce additional disadvantages, since, among other problems, the line must be accomodated to the varying distances between transmitter and receiver as the load is moved, while being kept from interfering with, or being damaged by, the lifting operation.

As noted earlier, it is desirable to obtain an indication of the tilt or inclination to the vertical of the crane hook. Because of the frequent shock and hard usage which the hook must undergo, it is necessary that the tilt sensor be rugged and quite reliable, yet it must also be compact.

SUMMARY OF THE INVENTION

1. Objects of the Invention

Accordingly, it is an object of the invention to provide an improved condition indicator for load-lifting devices.

Further, it is an object of the invention to provide an improved condition indicator utilizing a sensor and associated transmitter positioned at the load-lifting end of a cable.

A further object of the invention is to provide a crane load condition indicator in which a transmitter associated with a sensor is coupled to a receiver by means of a transmission line formed by the crane's load-lifting cable.

Yet a further object of the invention is to provide a crane weighing device having a transmitter coupled to a remote receiver which is operable in environments hostile to radiative transmission between transmitter and receiver.

A further object is to provide a simple, compact, rugged and reliable tilt sensor for sensing the orientation of a crane hook.

2. Brief Description of the Invention

In the present invention, the condition indicator comprises a sensor coupled to a transmitter positioned at the load-lifting end of the crane cable. For convenience they are mounted in a shell which is attached to the crane cable at its upper end and to a load-lifting hook at its lower end. The receiver, and its associated indicator, are positioned remote from the transmitter at an operating or monitoring station usually in the cab of the crane. The sensor modulates a carrier wave in the transmitter for transmission to the receiver.

One output terminal of the transmitter is connected to the crane hook; the other output terminal of the transmitter is connected to the load-lifting cable and thence to ground by way of the crane boom and the crane carriage. In this manner the hook serves as an "antenna" and the conducting path along the cable, boom and carriage serves as a ground return. Alternatively, one might consider the hook as one plate of a capacitor whose other plate is ground.

The receiver is connected to sense the current in the boom. That is, it responds to the ground return current of the transmitter. Since this current essentially corresponds to the entire power radiated from the antenna, the receiver has available to it a very large portion of the output of the transmitter, depending largely on the degree of coupling between the receiver and the ground return.

This should be contrasted with a conventional wireless system in which the receiver picks up energy radiated from the antenna and thus can intercept only a small fraction of the transmitter output. Moreover, obstacles to conventional wireless communication do not impair operation of our system. Rather, they often serve to enhance it. For example, when the crane hook is lowered into a ship hold, the antenna current increases by virtue of the increased capacitance between the antenna and ground. There is an equal increase in the ground return current to which the receiver responds and therefore the strength of the received signal actually increases.

Preferably, both the hook and the shell are electrically common and insulated from the cable. The transmitter output is applied between the shell and the cable. The capacitance between the shell and ground may be of the order of 15 pF; at a frequency of 175 kHz, this represents an impedance between shell and ground of the order of several hundred kilohms. The hook capacitance to ground adds to the shell capacitance and thus decreases this impedance somewhat.

The transmitter and receiver operate in the kHz range, and preferably in the range of from 50 kHz to 500 kHz. This encompasses the low-frequency range (30 kHz to 300 kHz) as well as the lower portion of the high-frequency range (300 kHz to 3 MHz). In this range the cable is electrically "short" with respect to carrier wavelength and thus both radiation from it and stray pickup by it are minimized.

At a frequency of 50 kHz, the wavelength of the signal is $6 \times 10^3$ meters, or approximately 18,000 feet; at 500 kHz, the wavelength is 600 meters, or approximately 1800 feet. Thus, at the lower frequency, the wavelength of the transmitted signal is much greater than the length of typical crane cables and booms and there is little or no radiation. Conversly, the cable and boom, being poor radiators, are also poor receiving antennas, and therefore pick up very little energy at this frequency from other transmitters which may be present in the area.

At the higher frequency, the wavelength of the transmitted signal is such that some of the larger cranes have booms and cables which may appear as a quarter-wavelength antenna to the transmitter and therefore a greater amount of radiation and stray pickup occurs. Accordingly, it is desirable to operate at the lower end of this frequency range, for example, at a frequency of the order of 175 kHz which is the frequency used in the preferred embodiment described herein.

In one embodiment of the invention, the transmitter is connected directly between the cable and shell. This embodiment is useful where only a single crane lifts the load. Where more than one crane lifts the same load, the transmitter is preferably transformer-coupled to the cable as described below. This prevents "cross-talk" between the crane units and avoids spurious weight indications caused by the cross-talk.

The sensor typically includes a weight-indicator which is conveniently formed from a load-cell connected between the cable and the load and having a number of strain gages connected to it. The strain gages are connected in a bridge circuit whose output is applied to the transmitter. The sensor also includes a tilt indicator which indicates the deviation of the cable from the vertical. This is especially useful when heavy loads are being lifted.

The tilt indicator comprises a cup-shaped container terminating a shallow cone at the bottom of the "cup". An aperture is located at the apex of the cone and a pin extends through the aperture to a switch positioned outside the cup and directly below the aperture; the pin is spring-loaded by the switch. A steel ball rides in the cup and normally presses on the pin to thereby restrain it. However, when the cup is tilted to the vertical by a sufficient amount, the ball rides up the walls of the cup away from the pin, thereby releasing the pin and actuating the switch. The switch is connected to the transmitter which then provides a tilt indication to the receiver.

The conical bottom of the cup holds the ball over the pin despite slight movements of the indicator but allow the ball to move freely off the pin when the indicator moves a predetermined amount (in the preferred embodiment, 5°) from the vertical. This prevents the jitter that would occur with slight movements of the indicator were the cup bottom of hemispherical shape.

An alternative manner of viewing the present invention is to view the transmitter and receiver as being connected in a series circuit by means of the crane boom and cable extending between them. The transmitter is returned to ground by means of the capacitance to ground of the shell and hook, while the receiver is returned to ground by way of the capacitance to ground of the crane carriage. Viewed in this manner, the transmitter applies a current to one end of the cable which is then carried along the cable and boom to the receiver. Still a further manner of viewing the present invention is to consider the cable and boom as one "wire" of a two wire transmission line between the transmitter and receiver, the other wire comprising the earth itself. The transmitter signal then propagates along this line to the receiver.

BRIEF DESCRIPTION OF THE DRAWING

The foregoing and other and further objects and features of the invention will be more readily understood on reference to the following detailed description of the invention when taken in conjunction with the accompanying drawings in which:

FIG. 5b is a diagram of the electrical circuit corresponding to the sketch of FIG. 5a;

FIG. 6 is a sketch of an equivalent electrical circuit which is especially useful when a load is being lifted by more than one crane as in FIG. 5a;

DESCRIPTION OF THE PREFERRED EMBODIMENTS

Figure 1:
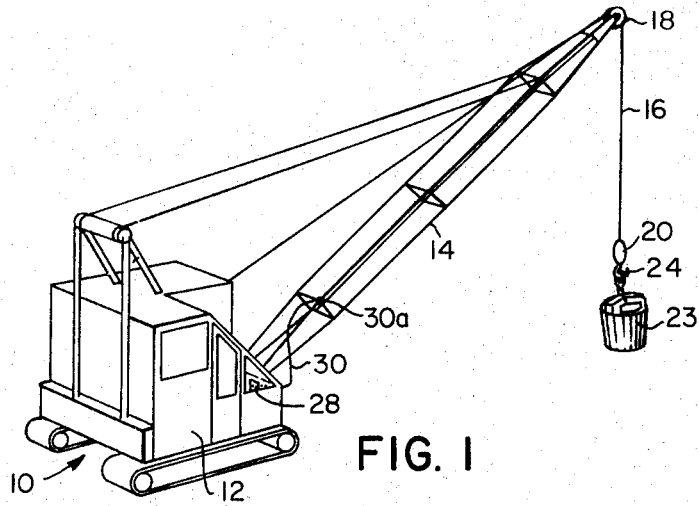
FIG. 1 is a sketch of a mobile crane-type load-lifting system with which the apparatus of the present invention may advantageously be used.
Figure 2:
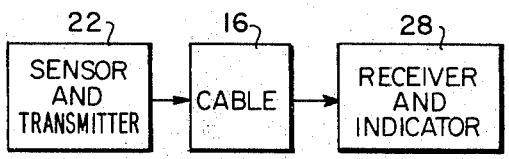
FIG. 2 is a simplified block and line diagram of the present invention.

In FIGS. 1 and 2, a mobile crane 10 has an operator's cab 12 from which a boom 14 extends. A cable 16 runs along the boom, over a sheave 18, and down to a shell 20. Contained within the shell 20 is a sensor and transmitter unit 22 (FIG. 2) which applies to the cable 16 a signal indicative of the weight of a load 23 applied to a hook 24 attached to the lower end of the shell. The remote end of the cable winds onto a drum (not shown) in cab 12. A combined receiver and indicator 28 is mounted in the cab 12; the receiver is connected to boom 14 at point 30a adjacent the cab end of the cable via lead 30 and thereby receives signals transmitted along the cable from the transmitter.

Figure 3:
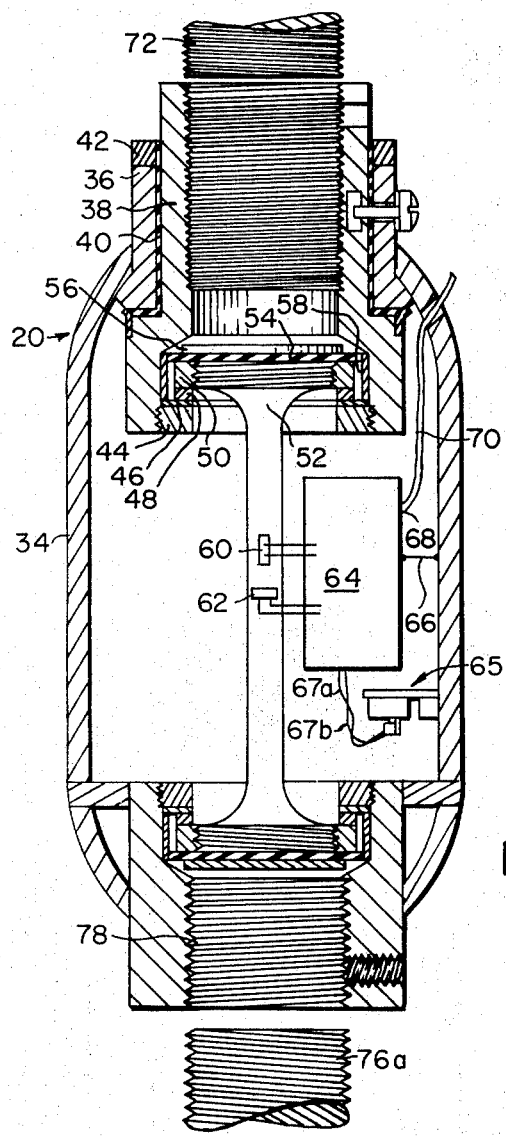
FIG. 3 is a vertical sectional view of a shell enclosing the weight sensors and transmitter in accordance with the preferred embodiment of the present invention.

A preferred form of construction for the shell 20 is shown in detail in FIG. 3. As shown therein, the shell comprises a generally cylindrical casing 34 having a converging upper end abutting against a flanged collar. Collar 36 is separated from an internally threaded connector block 38 by means of cylindrical insulator rings 40 and 42. At the lower end of block 38 a threaded collar 44 carries cylindrical insulators 46 and 48 which separate the collar 44 from a second collar 50 which carries a load cell 52 threaded therein. A circular insulating segment 54 separates the load cell from a scuff plate 56. Portions of the inner walls on the lower segment of the ring 38 are also lined with insulation 58. The bottom portion of the load cell and shell is similar to the upper portion and will not be described in detail.

Located on the load cell 52 are a pair of strain gauges 60, 62 coupled to a transmitter 64. Additionally, a tilt indicator 65 attached to the wall of shell 34 provides tilt signals to transmitter 64 via leads 67a, 67b. The indicator is described in detail below in connection with FIGS. 7 and 8. A first output terminal 66 of the transmitter 64 is connected directly to the shell 34. A second output terminal, 68, is connected through the shell via a lead 70 for coupling to load-end of the cable in a manner to be described below. The lead 70 is, of course, insulated from the shell 34.

A threaded fitting 72 at the upper end of shell 34 secures one end of cable 16 to the internally-threaded block 38. Similarly, at the lower end of the shell the upper portion of a hook (not shown) terminates in a threaded portion 76a to mate with an internally threaded block 78. In practice, it may also be desirable to interpose between the cable and shell or between the shell and hook a swivel which allows unrestricted rotational movement of the hook while maintaining the line in a vertical position. Preferably, this swivel is interposed between the shell and the hook. Such mechanisms are well known in the art, and therefore are not shown or further described.

Figure 4:
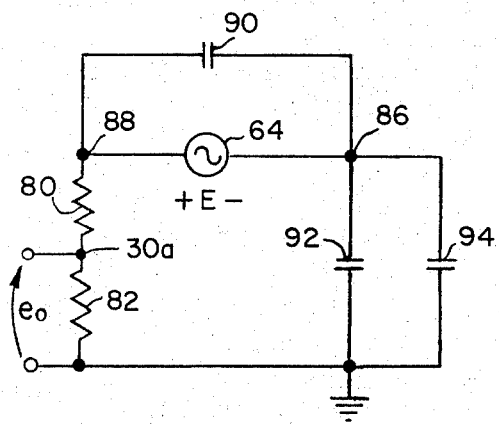
FIG. 4 is a diagram of the electrical circuit corresponding to the apparatus of FIG. 2.

Referring now to FIG. 4, there is shown an electric circuit corresponding to the configuration of FIG. 3. In this figure, the transmitter output is shown coupled directly between the cable and the shell. This corresponds to connecting the lead 70 of FIG. 3 directly to cable 16 at a point near the shell. The cable 16 extending between the transmitter 64 and the receiver 28 (see FIGS. 1 and 3) is represented by two resistors 80, 82 in series. The resistor 80 corresponds to the impedance of that portion of the line extending between the transmitter 64 and the node 30a (FIG. 1) at which the line 30 is connected to the boom 14. Similarly, the resistor 82 corresponds to the impedance of that portion of the line between the node 30a and ground. Where the cab 12 is mounted on rubber tires which insulate it from ground, the impedance between point 30a and ground is largely capacitive, consisting primarily of the capacitance to ground of the cab. The signal $e_0$ applied to the receiver and indicator 28 is taken across the resistor 82. A voltage generator 64, corresponding to the output of transmitter 64, applies a signal between a node 86, corresponding to the shell, and a node 88, corresponding to the end of the cable adjacent the shell.

The stray capacitance between the cable 16, on the one hand, and the hook and shell on the other, is represented by a capacitor 90. In similar manner, the stray capacitance to ground of the shell and hook is represented by a capacitor 92, while the capacitance to ground of the load being lifted by the hook is represented by a capacitor 94.

From FIG. 4 it is clear that the capacitors 92 and 94 provide a path to ground for the signal generated by the generator 84, and therefore allow a signal to be transmitted along the line represented by the resistors 80 and 82. Thus, the transmitter and receiver are connected by a wired transmission path without the necessity of stringing a separate wire or cable between them. It is assumed, of course, that the load-lifting cable itself is a conductive medium, as is generally the case.

The straightforward connection of the transmitter directly between the shell and the cable, as represented in FIG. 4, is adequate when only a single crane is lifting a load. However, when two or more cranes are lifting a common load, the presence of stray capacitance (represented by the capacitor 90 in FIG. 4) from the cable to the shell and hook provides a conductive path through which the output of the transmitter of one system may inadvertently be applied to the cable of the other system, and may therefore cause false weight indications.

Figure 5A:
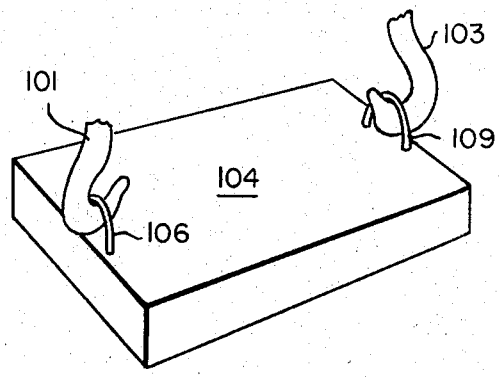
FIG. 5a is a sketch of a load being lifted by a pair of cranes of the type shown in FIG. 1.
Figure 5B:
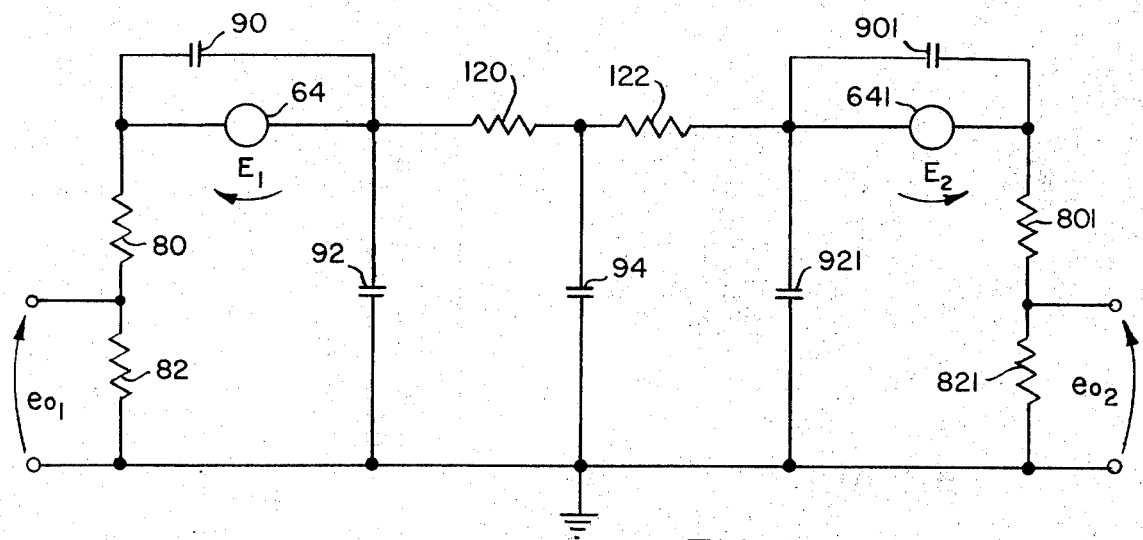

This will be understood more clearly on reference to FIGS. 5a and 5b. In FIG. 5a, hooks 101 and 103 attached to separate cranes (not shown) lift a common load 105 by means of rings 107 and 109. The corresponding electric circuit is shown in FIG. 5b. Resistors 80 and 82 correspond to the impedance of the first cable; this cable is driven from a generator 84, corresponding to the transmitter output of the first load-weighing system. As was previously the case, the stray capacitance from the cable to the shell and hook is represented by a capacitor 90, while the stray capacitance to ground of the shell and hook is represented by a capacitor 92. The second transmitter unit is represented by corresponding resistors 801 and 821, capacitors 90' and 92', and signal generator 84'. The load has a capacitance to ground represented by capacitor 94 and the impedance of a path through the load is represented by resistors 120, 122.

In the case of a load which is relatively non-conductive, the impedance of the conductive path between them, represented by the resistors 120, 122, is high and this minimizes the coupling between the two units. However, when the load is a conductive load such as a metallic load, the resistance of the conductive path between them is low. In the latter case, a portion of the signal from the generator 84 may be coupled across output resistor 82' of the second unit by following a path including resistors 120, 122, capacitor 90', and resistor 80'. Similarly, a portion of the output of the generator 84' may be coupled across resistor 82 by way of a path including resistors 120, 122, capacitor 90, and resistor 80. Under such circumstances, the indicators connected across the resistors 82 and 82' may provide a false indication of the weight of the load being applied to the corresponding cable.

To alleviate this problem, therefore, we prefer to couple the transmitter between the shell and the cable indirectly by means of a transformer having a tuned secondary winding presenting a maximum impedance in the secondary circuit at the transmitter frequency. Any signal at this frequency which is coupled into the secondary circuit from other than its own primary is therefore effectively blocked from the cable and thus will not cause spurious readings.

Figure 6:
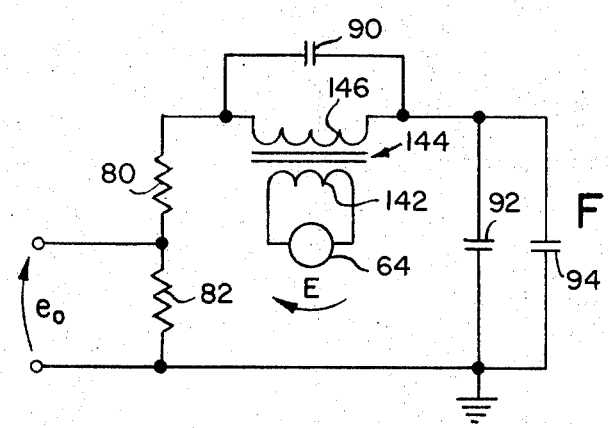

This will be understood more clearly on reference to FIG. 6, which is a schematic diagram of a second embodiment of the load-weighing system of the invention in which the transmitter output is transformer-coupled to the cable. As was previously the case resistors 80 and 82 correspond to the cable itself, while capacitor 90 corresponds to the stray capacitance from the cable to the hook and shell. Capacitor 92 corresponds to the stray capacitance from the hook and shell to ground together with the capacitance of the load to ground. A voltage generator 84 representing the transmitter output is applied to a primary winding 142 of a transformer 144. The secondary winding 146 of the transformer is connected in series with the cable represented by resistors 130, 132.

The secondary winding 146 may take the form of a coil connected to the cable at one end and to the hook at the other. The winding is chosen such that its inductance is of the proper magnitude to form a resonant circuit at the transmitter operating frequency with the stray capacitance from the cable to the hook and shell. When this condition is met, signals coupled into the secondary circuit from other than the primary winding are greatly attenuated by the high impedance presented by the resonant secondary and therefore are effectively isolated from transmission along the cable. Thus, when the configuration corresponding to FIG. 6 is utilized in two or more cranes lifting a common load as shown in FIG. 5, each transmitter will effectively drive only its own cable and therefore will not introduce cross-talk into the other cable.

Figure 7:
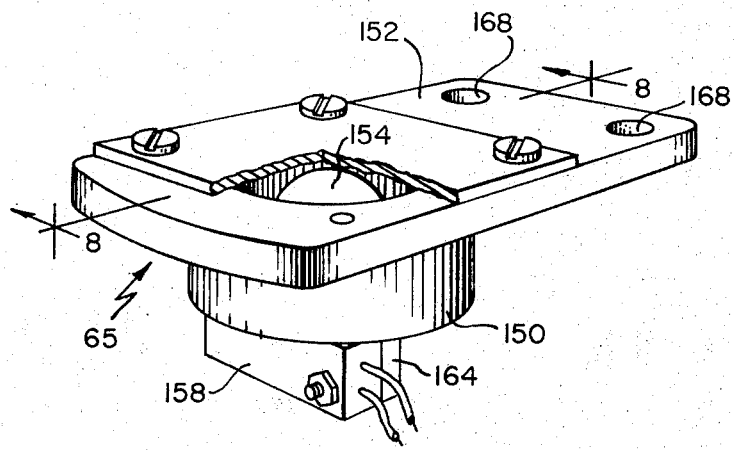
FIG. 7 is a view in perspective of a preferred form of tilt indicator in accordance with the invention.
Figure 8:
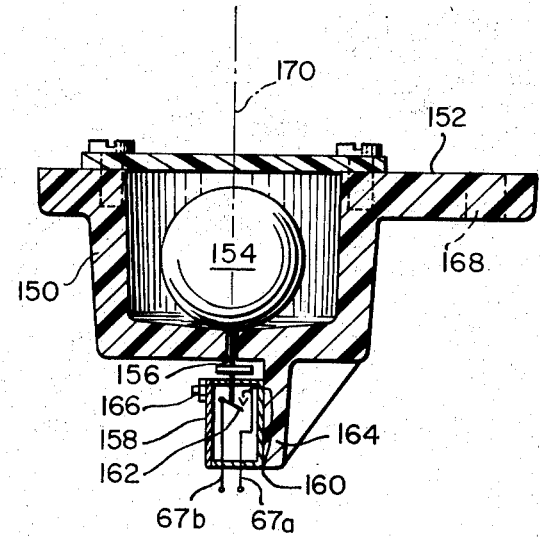
FIG. 8 is a sectional view along the lines 8—8 of FIG. 7.

Referring now to FIGS. 7 and 8, a simple, compact, rugged and reliable tilt indicator which may advantageously be used in the present invention is shown. The indicator 65 is formed from a cylindrical cup 150 extending downwardly from a platform 152; the bottom of the cup 150 terminates in a low-angled cone. A ball 154 is enclosed within the cup and contacts a pin 156 extending through an aperture in the bottom of the cup. The pin 156 is connected to a microswitch 158 having a fixed contact 160 and a movable arm 162. The latter is spring loaded and normally is in contact with the contact 160; however, with the ball 154 riding on it as shown in FIG. 8, it is held in the "open" position out of contact with the contact 160.

Contacts 160 and 162 are connected to leads 67a and to 67b, respectively; these leads in turn are connected to the transmitter as shown in FIG. 3 and modulate its output. The microswitch 158 is secured to a flange 164 extending from the cup 150 by means of screws 166. Apertures 168 in the platform 152 are provided to secure the tilt indicator 65 to the shell 34 as shown in FIG. 3.

The indicator 65 provides an indication of the tilt or deviation of the indicator from a vertical axis 170. It is normally mounted in the shell 34 so that the pin 156 is aligned with the vertical. In this position, the ball 154 rides directly on the pin 156 and holds the contacts 160, 162 open. In this position, no signal is applied to the transmitter. When the indicator 65 is tilted from the vertical, a gravitational force is exerted on the ball 154. This force moves the ball 154 away from the pin 156 when the tilt reaches a predetermined angle and allows the contacts 160, 162 to close, thus connecting leads 67a and 67b together to thereby provide an indication that the tilt has exceeded a predetermined magnitude. As the indicator 65 is restored to its normal position, centering force of increasing magnitude is exerted on the ball 154 until, at a given angle, the ball again returns to a position over the pin 156. This depresses the pin and again opens contacts 160, 162 to thereby cut off all further signals to the transmitter.

The angle at which the indicator 65 gives a tilt indication, and the angle at which it again returns to its no-tilt condition, is dependent on the size and the mass of the ball 54, the size of the cup 150, the angle of the cone formed at the bottom of this cup, the coefficient of friction of the material from which cup 150 is formed, and the spring loading on pin 156.

In the preferred embodiment of the invention, we use a stainless steel ball 1 inch in diameter placed in a high impact plastic cup having a 1.5 inches diameter at a bottom cone angle of 4.5°. The pin 156 protrudes approximately .03 inch into the chamber and the switch is 0.003 inch beyond the acutation point with the ball centered. It is loaded with a 10 gram spring bias. In this embodiment, the indicator rotates 5° from the vertical before a tilt indication is obtained, and returns to within approximately 2° of the vertical before the tilt indication is removed.

From the foregoing it will be seen that we have provided an improved condition sensing system which obviates the disadvantages of conventional wireless transmission systems without requiring the stringing of additional signal-transmitting cable between a transmitter and receiver. Further, we have provided a condition sensing system which operates with unimpaired performance in environments which would seriously affect the performance of conventional wireless systems. The system provides a rapid, display of such factors as load weight, load tilt angle, etc. so that the operator can readily avoid dangerous situations. It will also be seen that we have also provided a simply, compact, rugged and reliable tilt indicator for use in situations in which it will be subjected to high shock loads.

It will be understood that various changes may be made in implementing the invention without departing from its spirit or scope and that the foregoing embodiments are taken to be illustratively only and not in a limiting sense, the scope of the invention being defined in the claims.

Having defined our invention, we claim:

1. Apparatus for providing an indication of a selected condition at the load-end of a load-supporting cable, said apparatus comprising:
   A. a sensor
      1. positioned at the load-end of the cable;
      2. responsive to a selected condition at said loadend to generate an output indicative of said condition;
   B. a transmitter
      1. positioned at the load-end of the cable;
      2. connected to receive the output of said sensor;
      3. capacitively coupled between earth and said cable to apply a signal representative of the sensor output to said cable for transmission along said cable to the other end thereof;
   C. a receiver
      1. coupled to said cable at a position adjacent an end of the cable remote from the load end;
      2. responsive to the signal applied to the cable to provide an indication of the condition being sensed at the load-end of said cable.

2. Apparatus according to claim 1 in which said transmitter operates at frequencies whose wavelengths are greater than the cable length.

3. Apparatus according to claim 1 in which said transmitter operates at frequencies between 50 and 500 kilohertz.

4. Apparatus according to claim 1 including
   A. means for mechanically connecting a load to the load-supporting cable while electrically isolating it therefrom, said means providing a capacitive path to ground; and
   B. means for applying the transmitter output between the cable and the load-connecting means.

5. Apparatus according to claim 4 including means in electrical connection with the load-connecting means for increasing the capacitance between the load-connecting means and ground.

6. Apparatus according to claim 5 in which the capacitance increasing means comprises a case mechanically and electrically connected to the load-connecting means and protectively enclosing said sensor and said transmitter therein.

7. Apparatus according to claim 1 in which the end of the cable remote from the end to which the load is applied is grounded, and which includes a case:
   A. protectively enclosing the sensor and the transmitter;
   B. electrically insulated from the cable and providing a capacitance to ground;
   C. the transmitter output being connected between the cable and said case whereby a signal current path is provided through said capacitance and along said cable to the remote end thereof.

8. Apparatus according to claim 1 in which said sensor includes
   A. a load cell for mechanically connecting a load to the cable; and
   B. a plurality of strain gages connected to said cell and providing outputs indicative of the weight connected to said cell.

9. Apparatus according to claim 1 in which said sensor includes means at the load-lifting end of the cable for providing an output indicative of the amount by which the cable is inclined to the vertical.

10. Apparatus for providing an indication of the weight of a load attached to a load-supporting cable at a first end and lifted by a force-applying means at a second end, said apparatus comprising:
    A. a sensor
       1. located at said first cable end;
       2. providing an electrical output representative of the weight applied to said first cable end;
    B. a transmitter
       1. positioned at the load end of the cable;
       2. connected to receive said sensor output;
       3. having a first output terminal connected to apply a signal representative of the sensor output to the load end of the cable for transmission by the cable to the other end thereof;
       4. having a second output terminal capacitively coupled to earth;
       5. to thereby connect said cable as one portion of an electrical loop including earth;
    C. a receiver
       1. located at said second cable end;
       2. electrically connected to said cable adjacent said second end and responsive to the signal transmitted along said cable to provide an indication of the weight applied to the first end of the cable.

11. Apparatus according to claim 10 in which said cable serves as a transmission line for propagating the transmitter signal therealong.

12. Apparatus according to claim 11 in which
    A. the transmitter signal is connected between the first cable end and ground potential by means of a series capacitive path formed by stray capacitance to ground;
    B. the second end of the cable is at ground potential;
    C. the receiver is connected to the cable at a point above ground potential adjacent said second end.

13. Apparatus according to claim 12 in which said center frequency lies in the range of from 50 kHz to 500 kHz.

14. Apparatus according to claim 11 in which the transmitter signal is inductively coupled to the transmission line, the secondary side of the coupling circuit being adapted to form a resonant circuit with the stray capacitance associated with said first cable end to thereby drive said cable with said transmitter signal while providing a high impedance path to the line through said stray capacitance to signals other than said transmitter signal.

15. Apparatus according to claim 11
    A. which includes load-attaching means connected to said cable for attaching a load thereto;
    B. which includes a shell surrounding said sensor and said transmitter;
    C. at least one of said load-attaching means and said shell being electrically insulated from said cable and providing capacitance to earth for the passage of signal current therethrough when the second cable end is connected to earth potential.

16. Apparatus according to claim 15 in which said shell and said load attaching means are connected for operation at the same electrical potential whereby both said shell and said load attaching means provide capacitance to earth.

17. Apparatus according to claim 16 in which the transmitter signal is inductively coupled to the cable by a transformer having a primary winding in circuit with the transmitter and a secondary winding in circuit with the cable.

18. Apparatus according to claim 17 in which the secondary winding is chosen to form a resonant circuit with capacitive current paths between the cable and the load-applying means whereby the secondary circuit presents a high impedance path to signals other than transmitter signals passing through said load-attaching means.

* * * * *